D. SPALDING.
ATTACHMENT FOR A PAIR OF PLIERS.
APPLICATION FILED JAN. 25, 1916.
1,190,031.  Patented July 4, 1916.
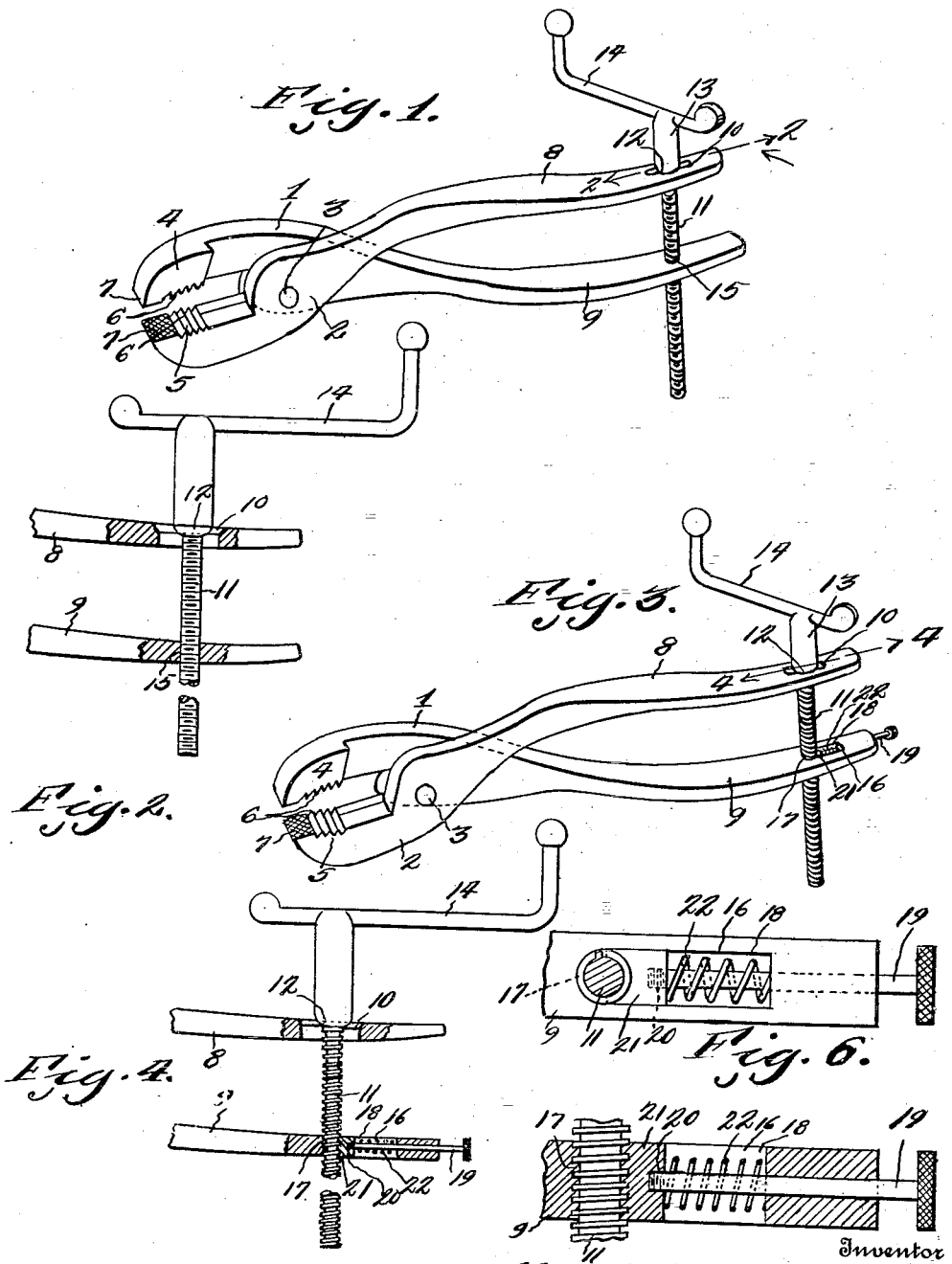

UNITED STATES PATENT OFFICE.

DAVID SPALDING, OF LONEROCK, OREGON.

ATTACHMENT FOR A PAIR OF PLIERS.

1,190,031.   Specification of Letters Patent.   Patented July 4, 1916.

Application filed January 25, 1916. Serial No. 74,147.

*To all whom it may concern:*

Be it known that I, DAVID SPALDING, a subject of Great Britain, residing at Lonerock, in the county of Gilliam, State of Oregon, have invented a new and useful Attachment for a Pair of Pliers; and I do hereby declare the following to be a full, clear, and exact description of the invention, such as will enable others skilled in the art to which it appertains to make and use the same.

This invention relates to an improved attachment for pliers for converting the same into a small vise or clamp, for use in connection with small pipes, bolts and the like.

Another object of the invention is to provide means whereby the jaws of the vise or pliers may be brought into clamping engagement with the object to be clamped very quickly, so that said jaws may be instantly tightened against said object.

In practical fields the details of construction may necessitate alterations, falling within the scope of what is claimed.

The invention comprises further features and combination of parts, as hereinafter set forth, shown in the drawings and claimed.

In the drawings: Figure 1 is a view in perspective of a pair of pliers constructed in accordance with the invention. Fig. 2 is a sectional view on line 2—2 of Fig. 1. Fig. 3 is a view in perspective of a pair of pliers illustrating the means whereby the jaws may be moved into engagement with the object to be clamped very quickly. Fig. 4 is a view partly in elevation and partly in section, for instance, upon line 4—4 of Fig. 3, showing the means whereby the jaws may be moved into clamping engagement quickly. Fig. 5 is an enlarged detail sectional view through one end of one of the handles of one of said jaws, more clearly showing the means adapted to be disengaged from the threads of the adjusting screw, to permit the screw to be adjusted quickly through the handle, so that the clamping jaws may be brought into clamping engagement with an object very quickly. Fig. 6 is a plan view of Fig. 5.

Referring more especially to the drawings, 1 and 2 designate a pair of members, which are pivotally united by virtue of the pivot bolt 3. The members 1 and 2 are provided with opposing coöperating jaws 4 and 5, the adjacent faces of which are supplied with the usual gripping teeth 6 and nurlings 7, to prevent the jaws from slipping, when in contact with the object that is being clamped. The members 1 and 2 have handles 8 and 9. The end portion of the handle 8 is formed with an elongated slot 10, through which the threaded shank 11 extends so that the shoulder 12 of the head of the shank will contact with the outer face of the handle. The head 13 of the shank is provided with a transverse bar 14, whereby the screw may be adjusted in one direction or the other through the threaded aperture 15 of the handle 9, reference being had to Figs. 1 and 2. However, in Fig. 3 the handle 9 is provided with an elongated slot 16, and the crotch of this slot at one end thereof is provided with threads 17, with which the threads of the screw 11 engage. In plan view the threads 17 are semicircular. The distance between the diametrically opposite ends of said threads 17 is narrower than the width of the end portion 18 of the slot 16, so that when the threads of the screw 11 are disengaged from the threads 17, and the screw moved into the wider portion of the slot 18, the screw may be moved quickly back and forth through the slot 16, so that the handles may be quickly adjusted toward and from one another, which will correspondingly adjust the jaws. Mounted through the extreme end portion of the handle 9 axially is a thumb member 19 having the end of its shank threaded at 20 in a block 21, which is so shaped as to slide in the wider portion 18 of the slot 16. Interposed between the block 21 and the end wall of the wider part of the slot 16 and mounted upon the shank of the thumb member 19 is a coil spring 22, which exerts sufficient pressure upon the block 21 so that one of its faces engages the screw 11, so as to hold its thread in engagement with the thread 17, so that the handles 8 and 9 may be adjusted toward each other gradually. However, to adjust the handles 8 and 9 quickly toward each other, so as to bring the clamping jaws quickly in contact with the object to be clamped, the block 21 may be pulled or moved quickly from contact with the screw 11, by pulling upon the thumb member 19, so that the thread of the screw 11 may be disengaged from the threads 17 at one end of the slot 16, and moving the screw 11 so as to pass through the wider part 18 of the slot 16, after which the handles 8 and 9 may be moved quickly toward and from each other, for quickly adjusting the jaws of the members 1 and 2.

It is to be noted that the detail construction of the adjustable parts of the means for adjusting the handles toward and from each other may be varied.

The invention having been set forth, what is claimed as new and useful is:

In combination with a pair of quickly adjustable pliers having a pair of handles, means for holding the handles in different adjusted positions for holding the jaws of the pliers in different adjusted positions, said means, comprising elongated openings in said handles, a screw loosely extending through the opening of one handle and being threaded in engagement with one end of the opening of the other handle, and means for disengageably holding said screw in engagement with the threaded end of said opening, whereby the screw may be quickly adjusted, said last mentioned means comprising a block guided in the opening having the threads at one end, said block having a semi-circular face provided with threads to engage the threads of the screw opposite the threads of said opening, a pin extending axially through the end of the handle having the block and being connected to the block, and a spring interposed between the block and one end of the opening, in which said block is mounted.

In testimony whereof I have signed my name to this specification in the presence of two subscribing witnesses.

DAVID SPALDING.

Witnesses:
 GUY HUDDLESTON,
 J. B. GOFF.